United States Patent Office 2,775,593
Patented Dec. 25, 1956

2,775,593

THIOSEMICARBAZONES OF ALDEHYDES AND KETONES OF THE HETEROCYCLIC SERIES

Robert Behnisch and Fritz Mietzsch, Wuppertal-Elberfeld, and Hans Schmidt, Wuppertal-Vohwinkel, Germany, assignors, by mesne assignments, to Schenley Industries, Inc., New York, N. Y., a corporation of Delaware No Drawing. Application November 17, 1949, Serial No. 128,022

In Germany October 1, 1948

Public Law 619, August 23, 1954, Patent expires October 1, 1968

6 Claims. (Cl. 260—279)

The present invention relates to chemistry and has for an object the provision of certain novel compounds of the thiosemicarbazone series. More particularly, the invention contemplates the provision of novel thiosemicarbazones of heterocyclic oxo-compounds which are effective in combating tubercle bacilli, and to methods or processes for producing such compounds.

The invention is based on our discovery that thiosemicarbazones produced from heterocyclic or aromatic heterocyclic oxo-compounds carrying the oxo-group at or in a heterocyclic residue, or from aromatic-heterocyclic oxo-compounds substituted by an oxo-group in an aromatic nucleus fused to a heterocyclic nucleus, are highly efficacious in treating tuberculous infections of warm-blooded animals.

The oxo-group may be present in form of an aldehyde-group or of a keto-group. For instance, pyrroles, pyridines, indoles, quinolines, isoquinolines, acridines, imidazoles, pyrazoles, pyrimidines, pyrazines, pyridazines, triazoles, triazines, benzimidazoles, cinnolines, quinazolines, quinoxalines, furans, benzofurans, thiophenes, thionaphthenes, oxazoles, thiazoles, thiodiazoles, benzoxazoles, and benzthiazoles with aldehyde- or keto-groups in the heterocyclic nucleus may be used as starting materials. Heterocyclic ring-ketones, such as isatin, hydroxythionaphthene, thionaphthene-quinone etc. may also be used. Finally, aromatic-heterocyclic compounds, such as indoles, carbazoles, quinolines, isoquinolines, acridines, benzimidazoles, cinnolines, quinazolines, quinoxalines, benzofurans, dibenzofurans, thionaphthenes, diphenylenesulfides, benzofflazoles, and benzthiazoles carrying the aldehyde- or keto-group in the fused aromatic nucleus may be employed. Besides the aldehyde- and keto-group the heterocyclic or aromatic-heterocyclic nuclei may carry further substituents, described in the article by Gerhard Domagk and us that was published in Naturwissenchaften 1946, vol. 33, page 315 et seq., to be useful, such as nitro-, amino-, alkylamino-, acylamino-, arylideneamino-, alkyl-, cyan-, carboxyl-, hydroxy- and alkoxy-, alkylmercapto-, alkylsulfoxide- and alkyl-sulfone-radicals. The thiosemicarbazones may be derived from unsubstituted thiosemicarbazide or from heterocyclic substituted derivatives thereof.

The production of the novel compounds of our invention may be effected in accordance with conventional procedures.

For instance, heterocyclic and aromatic-heterocyclic compounds carrying an oxo-group at or in the heterocyclic nucleus, or aromatic-heterocyclic compounds substituted at the fused aromatic nucleus by an oxo-group, can be reacted with thiosemicarbazide or with heterocyclic substituted derivatives thereof. Introduction of the thiosemicarbazono radical may be effected also in stepwise fashion by (1) reacting the oxo-compounds with hydrazine or derivatives of hydrazine to form hydrazides which are then reacted with thiocyanogen compounds or isothiocyanates, or (2) by producing semicarbazones from semicarbazides and the oxo-compounds and reacting these with sulfur compounds.

Instead of the oxo-compounds the functional derivatives of the oxo-compounds may be used in the foregoing processes. As functional derivatives, we mean all those derivatives of the oxo-compounds which in the above-described processes can replace the oxo-compounds. Such functional derivatives are, for instance, the corresponding thioaldehydes, thioketones, acetals, mercaptans, diacetals, hemiacetals, dihalogen or bisulfite compounds.

The new compounds can also be obtained by converting thiosemicarbazones of suitable oxo-containing intermediate products which are capable of forming heterocyclic or aromatic-heterocyclic compounds carrying the thiosemicarbazone-group at or in the heterocyclic nucleus or of forming aromatic heterocyclic compounds with the thiosemicarbazone-group at the fused aromatic nucleus by subsequently closing the desired heterocyclic nucleus. The means by which the foregoing reactions may be effected are known and readily suggest themselves to those skilled in the art.

Apart from their utility as tuberculostatic agents, the compounds of the invention are also useful for other purposes, such, for example, as insecticides.

In order to facilitate a better understanding of the subject matter of this invention and the manner in which the compounds of the invention can be prepared, several examples follow, provided by way of illustration only and not by way of limitation upon the scope of our invention.

*Example 1*

Thiosemicarbazones of quinolinecarboxaldehydes typified by compounds having the formulae:

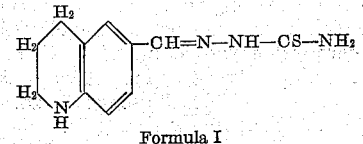

Formula I

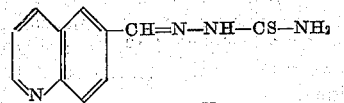

Formula II

Eighty-three (83) grams of 6-(1,2,3,4-tetrahydro)-quinolinecarboxaldehyde are dissolved in alcohol by heating and a solution of 47 grams of thiosemicarbazide in hot water and some drops of acetic acid are added. After one hour's heating on the water bath, the solution is cooled whereby the thiosemicarbazone of 6-(1,2,3,4-tetrahydro)-quinolinecarboxaldehyde (Formula I hereinabove) is precipitated. After recrystallizing from butanol, yellow-brown needles are obtained, which melt at 219° C. after previous discoloration with foaming to form a red liquid.

In the same manner the thiosemicarbazone of N-methyl-6-(1,2,3,4-tetrahydro)quinolinecarboxaldehyde is obtained from N-methyl-6-(1,2,3,4-tetrahydro)quinolinecarboxaldehyde in the form of yellow crystals melting at 219° C. with foaming to form a dark-red melt.

On using 6-quinolinecarboxaldehyde, a yellow thiosemicarbazone (Formula II hereinbefore) is obtained which melts at 219° C. with foaming.

In analogous manner, one may prepare the thiosemicarbazones of 4, 7 and 8-quinolinecarboxaldehydes; N-methyl-4 and N-methyl-6-quinolinecarboxaldehydes; 6-methoxy, 6-acetamino, 7-dimethylamino-4-quinolinecarboxaldehydes; 4-methoxy, 4-amino and 4-acetamino-6-carboxaldehydes; and 1-isoquinolinecarboxaldehyde.

Example 2

Thiosemicarbazones of indolecarboxaldehydes typified by compounds having the formulae:

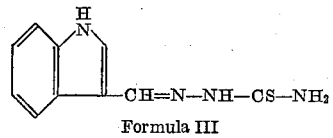

Formula III

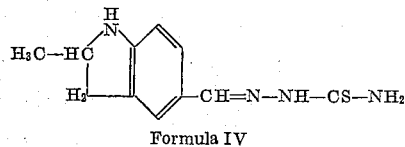

Formula IV

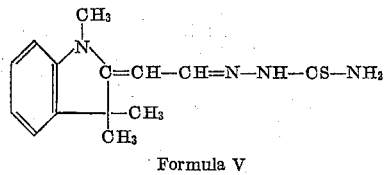

Formula V

A solution of 5.1 grams of 3-indolecarboxaldehyde in 500 ccs. of alcohol is reacted with a hot solution of 4.0 grams of thiosemicarbazide in 50 ccs. of water and kept at the boil for 15 minutes. The thiosemibazone of 3-indolecarboxaldehyde, having Formula III hereinbefore, precipitates from the solution while the solution is still warm and, after cooling the solution, it is separated by suction filtration, washed with alcohol and dried. The reaction product consists of brownish-yellow, sandy crystals melting at 232° C. with decomposition.

In the same manner, the thiosemicarbazone melting at 197° C. (with decomposition) is obtained from N-methyl-3-indolecarboxaldehyde. The thiosemicarbazone of 2-methyl-3-indolecarboxaldehyde forms as faint greenish crystals of the melting point 213° C. (with decomposition); the thiosemicarbazone of 2-methyl-5-(2,3-dihydro)indolecarboxaldehyde (Formula IV hereinabove) forms faint reddish crystals of the melting point 178° C. (with decomposition); the thiosemicarbazone of 1,3,3-trimethyl-$\Delta^{2,\alpha}$-indolineacetaldehyde (Formula V hereinbefore) forms yellow crystals of the melting point 176° C. (with decomposition); and the thiosemicarbazone of 5-methoxy-1,3,3-trimethyl-$\Delta^{2,\alpha}$-indolineacetaldehyde forms yellow crystals of the melting point 178° C. (with decomposition).

Example 3

Thiosemicarbazones typified by the thiosemicarbazone of 3-thianaphthenecarboxaldehyde having the formula:

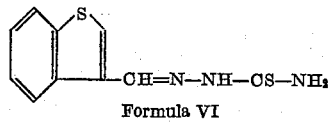

Formula VI

Fifty (50) grams of 3-thianaphthenecarboxaldehyde (prepared from thianaphthene by reaction with N-methyl-formanilide and phosphorus oxychloride in accordance with the general method described by A. Vilsmeier and A. Haack, in Berichte, 1927, vol. 60B, pages 119–122) is dissolved in boiling alcohol and reacted with a hot solution of 21 grams of thiosemicarbazide in 60% alcohol. The thiosemicarbazone of 3-thianaphthenecarboxaldehyde (Formula VI hereinbefore) is precipitated almost instantly in nearly colorless crystals melting at 217° C. with foaming to form a light red melt.

In analogous manner, the thiosemicarbazones of 2-benzothiazolecarboxaldehyde, 2-benzoxazolecarboxaldehyde and 2-benzimidazolecarboxaldehyde can be obtained.

Example 4

Thiosemicarbazones of pyridinecarboxaldehydes typified by the compound having the following formula:

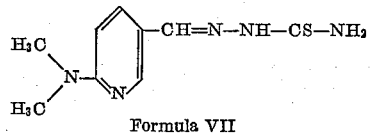

Formula VII 2-dimethylamino-5-pyridinecarboxaldehyde (prepared from 2-dimethylaminopyridine by reaction with N-methyl-formanilide and phosphorus oxychloride in accordance with the method of Vilsmeier and Haack (see Example 3 hereinabove) and which may also be referred to as 5-dimethylaminonicotinylaldehyde) is converted into thiosemicarbazone as described in the foregoing examples. The new compound, which is represented by Formula VII hereinabove, forms faint greenish yellow crystals melting at 218° C. with foaming to form a red liquid.

In a similar manner, the thiosemicarbazones of 2, 3 and 4-pyridinecarboxaldehydes (picolinyl, nicotinyl and iso-nicotinyl aldehydes), which are described and claimed in our U. S. Patent No. 2,719,161; 2-butoxy and 2-acetamino-5-pyridinecarboxaldehydes; and 4-butoxy, 4-dimethylamino and 4-acetamino-3-pyridinecarboxylaldehydes can be obtained.

Example 5

Thiosemicarbazone of 9-acridinecarboxaldehyde represented by the formula:

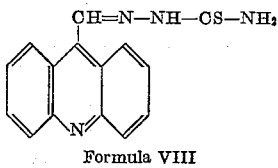

Formula VIII

Eighteen (18) grams of 9-acridinecarboxaldehyde is reacted in a mixture of 50 ccs. of alcohol, 50 ccs. of water and 50 ccs. of acetic acid with 9 grams of thiosemicarbazide with heating. The resulting mixture is heated at the boil for one hour and cooled. The thiosemicarbazone precipitates from the solution while the solution is still warm, and, after cooling the solution, it is separated by suction filtration, washed with alcohol and water, and dried. The thiosemicarbazone (Formula VIII hereinbefore) yields yellow crystals of the melting point 235° C. An almost quantitative yield is obtained.

Example 6

Thiosemicarbazone of isatin represented by the formula:

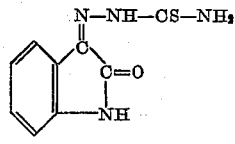

Formula IX

Seventy-three and five-tenths (73.5) grams of isatin is almost completely dissolved in 600 ccs. of boiling alcohol and reacted with a hot solution of 46 grams of thiosemicarbazide in 60 percent alcohol. A clear solution is first obtained. On further heating, the thiosemicarbazone of isatin (Formula IX hereinbefore) precipitates from the solution while hot in the form, and the precipitate is washed with dilute alcohol and dried. After recrystallizing from butanol, yellow, felted needles are obtained which gradually decompose on heating above 200° C. with red discoloration.

Example 7

Thiosemicarbazones typified by the thiosemicarbazone of 3-hydroxythianaphthene having the formula:

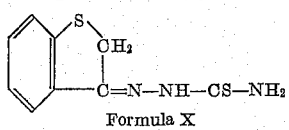

Formula X

The thiosemicarbazone of 3-hydroxythianaphthene, prepared in a similar manner, is a compound which, upon recrystallizing from butanol, consists of faint reddish colored crystals with the melting point 193° C. (with foaming).

The thiosemicarbazone prepared from 2,3-thianaphthaquinone forms brownish, felted needles having a melting point of 203° C.

Example 8

Thiosemicarbazone of 4-antipyrinecarboxaldehyde represented by the formula:

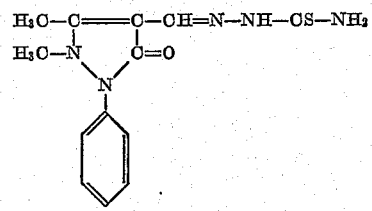

Formula XI

Twenty-one (21) grams of 4-antipyrinecarboxaldehyde (which is the 4-carboxaldehyde of 1,5-dimethyl-2-phenyl-3-pyrazolone, which may be prepared as described by K. Bodendorf, J. Mildner and T. Lehman in Annalen, 1949, vol. 563, pages 1 to 11) is dissolved in 100 ccs. of hot alcohol and reacted with 10 grams of thiosemicarbazide, dissolved in 50 ccs. of hot water. After adding 5 ccs. of glacial acetic acid and the main portion of the thiosemicarbazone of 4-antipyrinecarboxaldehyde (Formula XI hereinabove) precipitates in the form of bright, light yellow needles. For completing the reaction, boiling is continued for an additional 5 minutes and the solution is cooled and the thiosemicarbazone crystals are separated by suction filtration. The resulting compound, melting at 225-226° C., is obtained in a yield of 24 grams. An additional small amount of the compound can be obtained from the mother liquors.

Example 9

Alternative method for the production of the thiosemicarbazone of 4-antipyridinecarboxaldehyde (Formula XI).

Twenty-one (21) grams of 4-antipyrinecarboxaldehyde dissolved in 200 ccs. of 10 percent acetic acid is heated with 10 grams of thiosemicarbazide. The thiosemicarbazone precipitates after boiling for a short period in the form of a fine crystalline deposit. After cooling and filtering the solution, 22-24 grams of the compound, having a melting point of 224-225° C., are obtained. A further small amount of the reaction product may be obtained from the mother liquors.

Inasmuch as the foregoing specification comprises preferred embodiments of the invention, it is to be understood that the invention is not restricted thereto, and that modifications and variations in conventional manner may be made therein without departing from the invention, which is limited solely by the scope of the appended claims.

We claim:

1. A thiosemicarbazone of a carbonyl compound of the group consisting of
   (a) Quinolinecarboxaldehyde,
   (b) 6-(1,2,3,4-tetrahydro)quinolinecarboxaldehyde,
   (c) 3-indolecarboxaldehyde,
   (d) N-methyl-3-indolecarboxaldehyde,
   (e) 2-methyl-3-indolecarboxaldehyde,
   (f) 2-methyl-5-(2,3-dihydro)indolecarboxaldehyde,
   (g) 1,3,3-trimethyl-$\Delta^{2,\alpha}$-indolineacetaldehyde,
   (h) 5-methoxy - 1,3,3 - trimethyl - $\Delta^{2,\alpha}$ - indolineacetaldehyde,
   (i) 3-thianaphthenecarboxaldehyde,
   (j) 2-dimethylamino-5-pyridinecarboxaldehyde,
   (k) 9-acridinecarboxaldehyde, and
   (l) Isatin.

2. The thiosemicarbazone of 6-(1,2,3,4-tetrahydro)-quinolinecarboxaldehyde represented by the formula:

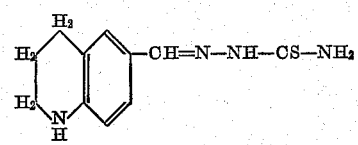

3. The thiosemicarbazone of 3-indolecarboxaldehyde represented by the formula:

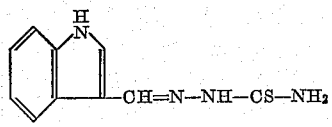

4. The thiosemicarbazone of isatin represented by the formula:

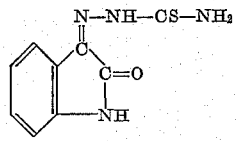

5. The thiosemicarbazone of 6-quinolinecarboxaldehyde represented by the formula:

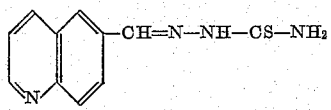

6. The thiosemicarbazone of N-methyl-3-indolecarboxaldehyde represented by the formula:

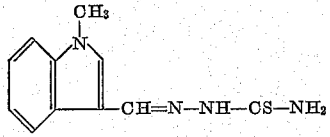

References Cited in the file of this patent

UNITED STATES PATENTS 2,416,239    Stillman et al. _____ Feb. 18, 1947

OTHER REFERENCES

Neuberg et al.: Berichte, vol. 35, pp. 2049-55 (1902).
Hoggarth et al.: Br. J. Pharmacol., vol. 4, pp. 248-53 (September 1949).
Domagk: Zentralblatt für Gynakologie, vol. 69, pp. 833-38 (1947).
Freund et al.: Berichte, vol. 35, pp. 2602-06 (1902).